United States Patent [19]

Mills

[11] 4,312,409
[45] Jan. 26, 1982

[54] ROTARY HOE IMPLEMENT

[75] Inventor: Franky D. Mills, Plainview, Tex.

[73] Assignee: The Hamby Company, Plainview, Tex.

[21] Appl. No.: 200,773

[22] Filed: Oct. 27, 1980

Related U.S. Application Data

[63] Continuation of Ser. No. 929,003, Jul. 28, 1978, abandoned.

[51] Int. Cl.³ .................. A01B 21/04; A01B 39/08
[52] U.S. Cl. .................. 172/551; 172/572; 172/556
[58] Field of Search .......... 172/572, 573, 705, 551, 172/500, 556, 621, 643; 111/85; 267/20 A, 20 R, 177; 248/295 B

[56] References Cited

U.S. PATENT DOCUMENTS

| | | |
|---|---|---|
| 1,062,660 | 5/1913 | Nugent . |
| 1,081,437 | 12/1913 | DeLong .................. 172/556 X |
| 2,252,593 | 8/1941 | Bruene . |
| 2,701,512 | 2/1955 | Haynes . |
| 2,760,772 | 8/1956 | McIntyre . |
| 3,098,529 | 7/1963 | Wade et al. . |
| 3,175,522 | 3/1965 | Garber et al. . |
| 3,322,203 | 5/1967 | Johnson .................. 172/500 X |
| 3,372,960 | 3/1968 | Fisher . |
| 3,452,826 | 7/1969 | Lehman . |
| 3,554,297 | 1/1971 | Lehman . |
| 3,608,646 | 9/1971 | Ryan . |
| 3,635,291 | 1/1972 | Tomanek . |
| 3,734,201 | 5/1973 | Zaun . |
| 3,923,103 | 12/1975 | Davis .................. 172/624 |
| 3,951,214 | 4/1976 | Ramsower . |
| 4,194,575 | 3/1980 | Whalen .................. 172/573 |
| 4,241,793 | 12/1980 | Watkins .................. 172/705 |

FOREIGN PATENT DOCUMENTS 638172  5/1950  United Kingdom .

*Primary Examiner*—Richard J. Johnson
*Attorney, Agent, or Firm*—Fishburn, Gold and Litman

[57] ABSTRACT

A rotary hoe implement includes upstanding spacer members for connection to a tool bar for drafting by a tractor. A rotary hoe supporting arm is pivotally connected to a lower end of the spacer member and an elongate adjustment rod extends from a rear end of the rotary hoe supporting arm to an upper end of the spacer member. A spring member is sleeved on the adjustment rod and cooperates with spring length adjusters on the rod to bias the rotary hoe downwardly into ground engagement and control the up and down movement thereof as the hoe travels over the earth surface. The rotary hoe implements are constructed or ganged together as units and are selectively mountable along the length of the tool bar for operator control.

9 Claims, 12 Drawing Figures

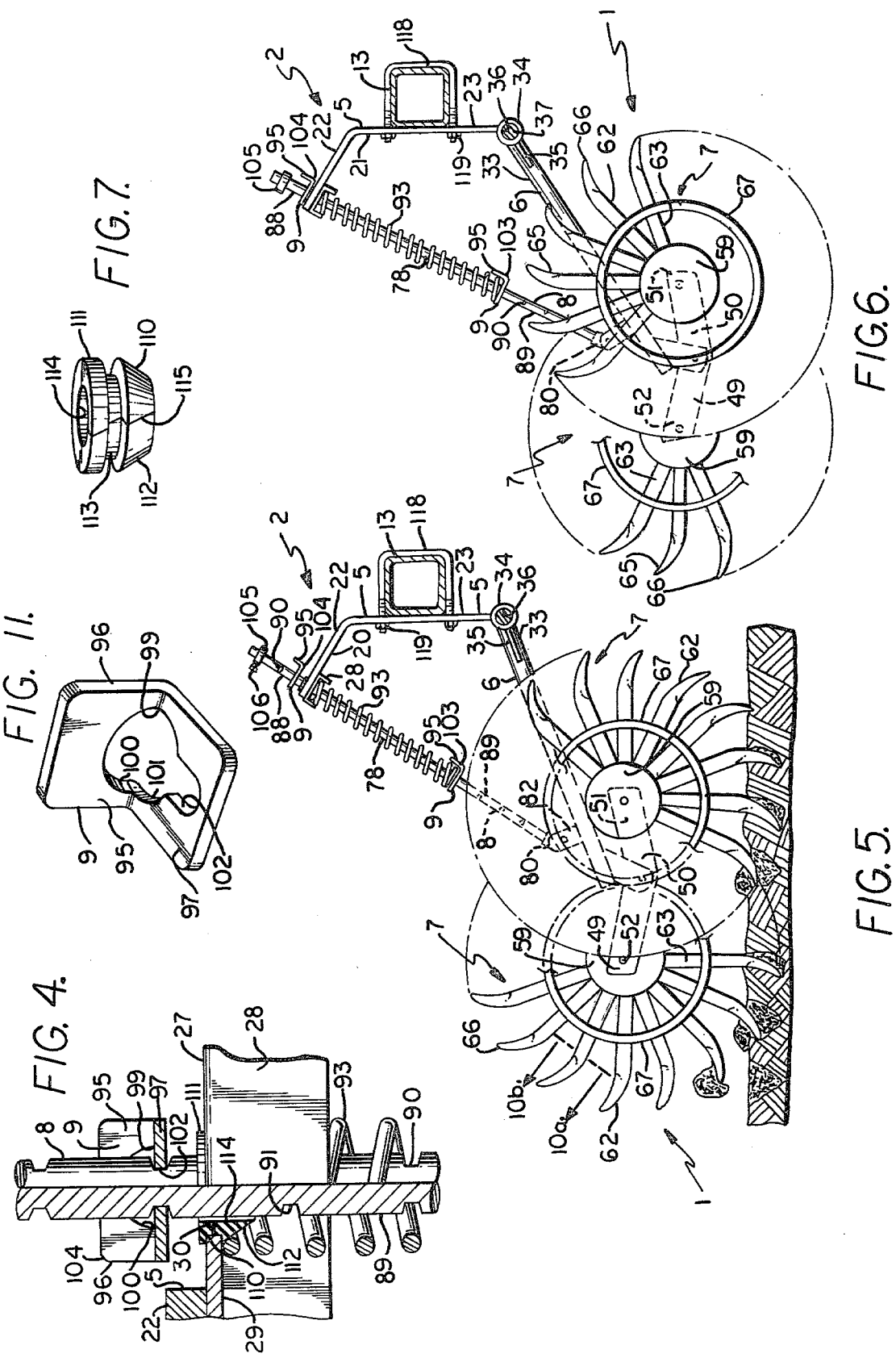

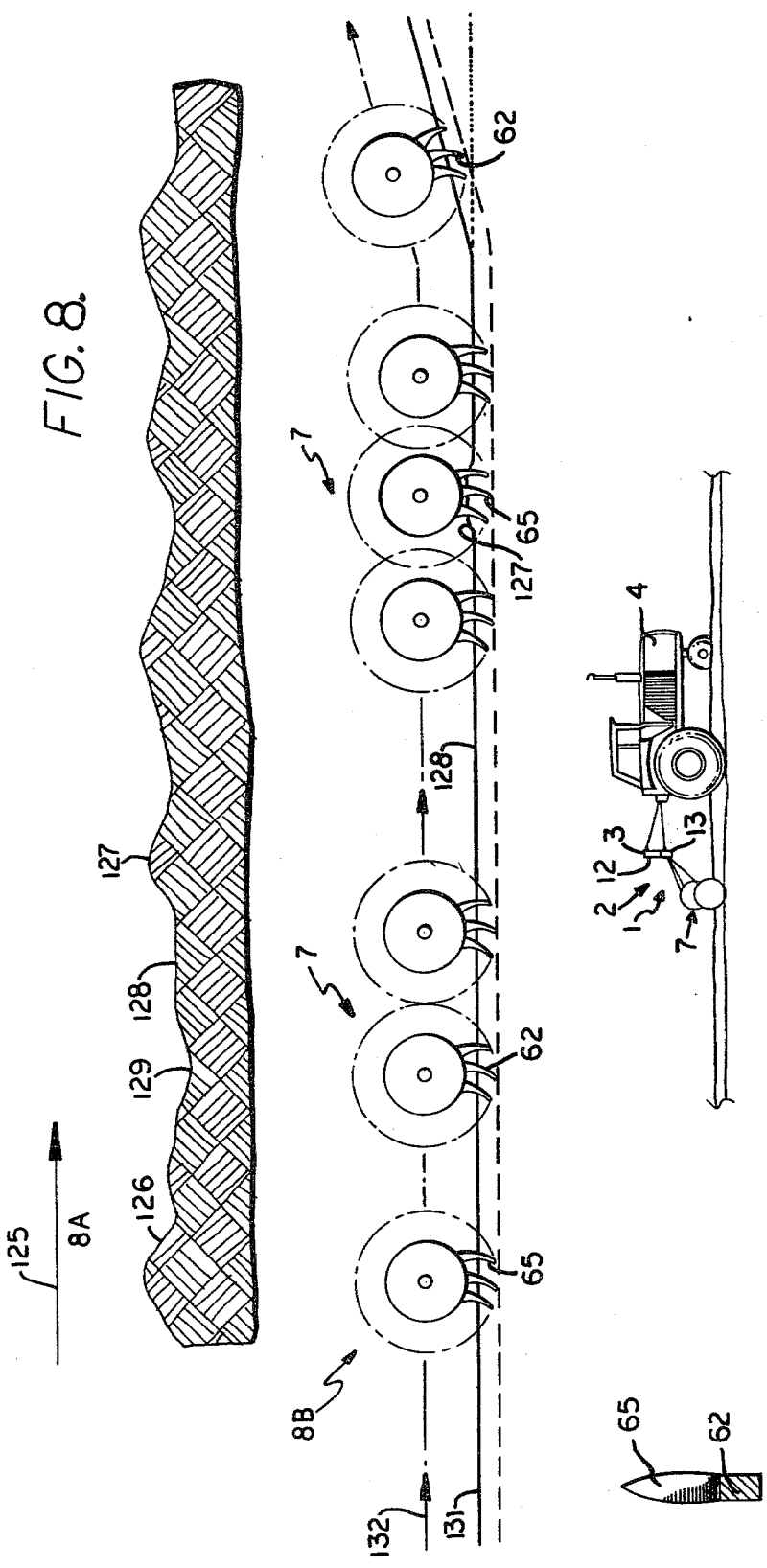

ROTARY HOE IMPLEMENT

This application is a continuation of application Ser. No. 929,003, filed July 28, 1978 now abandoned.

This invention relates to rotary hoe implements and particularly to such rotary hoes which are resiliently biased into ground engagement.

When cultivating row crops, and particularly when such row crops are grown in areas of low rainfall or semi-arid conditions, it is desirable to periodically break up any dry, hardened crust surrounding the plants to encourage root growth and retain rainfall. When the hard pan or crust remains unbroken, rainfall may flow off the field with such speed that undesirable erosion and wash occurs. Moreover, hoeing uproots weeds that would otherwise tend to choke out or retard the growth of the crops.

Wide implements have been developed for working large fields however, problems are often encountered with prior art wide rotary hoe implements in that undesirable vibratory effects occur. Many such wide implements are not sufficiently adjustable for the operator or farmer who desires to best match the working of the implement to the particular soil type, terrain and crop.

In view of the above, the principle objects of the present invention are: to provide a rotary hoe implement which is biased into downward engagement with the earth surface for controlled vertical movement over rolling terrain; to provide such an implement having adjustment means which are easily set to control the downward biasing of the implement into ground engagement; to provide such an implement having rotary hoe tools which are mounted on a swing arm arrangement permitting effective contact with rolling terrain; to provide such an implement which can be readily constructed in units thereof for detachment from a tool bar and selective mounting along the length of a tool bar; to provide such an implement in which the biasing adjustment means thereof are easy to adjust, yet remain secure during the vibration and jouncing of the implement over a field surface; to provide such an implement which is connectable to tool bars of different sizes and configurations; to provide such an implement having a plurality of individual rotary hoe tools which can be separately adjusted in the amount of earth engaging pressure; and to provide such an implement which is relatively inexpensive, highly reliable in use and well adapted for its intended purpose.

Other objects of the invention will become apparent from the following description taken in connection with the accompanying drawings wherein is set forth, by way of illustration and example, a certain embodiment of this invention.

DESCRIPTION OF THE DRAWINGS

FIG. 4 is an enlarged, fragmentary view of a portion of the rotary hoe implement.

FIG. 5 is a side elevational view of the rotary hoe implement and showing a biasing means thereof in a first selected adjustment position.

FIG. 6 is a side elevational view of the rotary hoe implement and showing the biasing means thereof in a second adjustment position.

FIG. 7 is a perspective view of a bushing member of the rotary hoe implement.

FIG. 8 is diagramatic representation of the path of movement of the rotary hoe implement in view 8a over irregular terrain and in view 8b over substantially flat terrain.

FIG. 9 is a diagramatic view of the rotary hoe implement unit drawn by a prime mover.

FIG. 10 is a transverse sectional view of a ground engaging tooth of the rotary hoe taken along lines 10a-10b, FIG. 5.

FIG. 11 is a plan view of an adjustment clip for use with the rotary hoe implement.

DESCRIPTION OF THE PREFERRED EMBODIMENT

As required, a detailed embodiment of the present invention is disclosed herein, however, it is to be understood that the disclosed embodiment is merely exemplary of the invention which may be embodied in various forms. Therefore, specific functional and structural details disclosed herein are not to be interpreted as limiting, but merely as a basis for the claims and as a representative basis for teaching one skilled in the art to variously employ the present invention in virtually any appropriately detailed structure.

Figure 1:
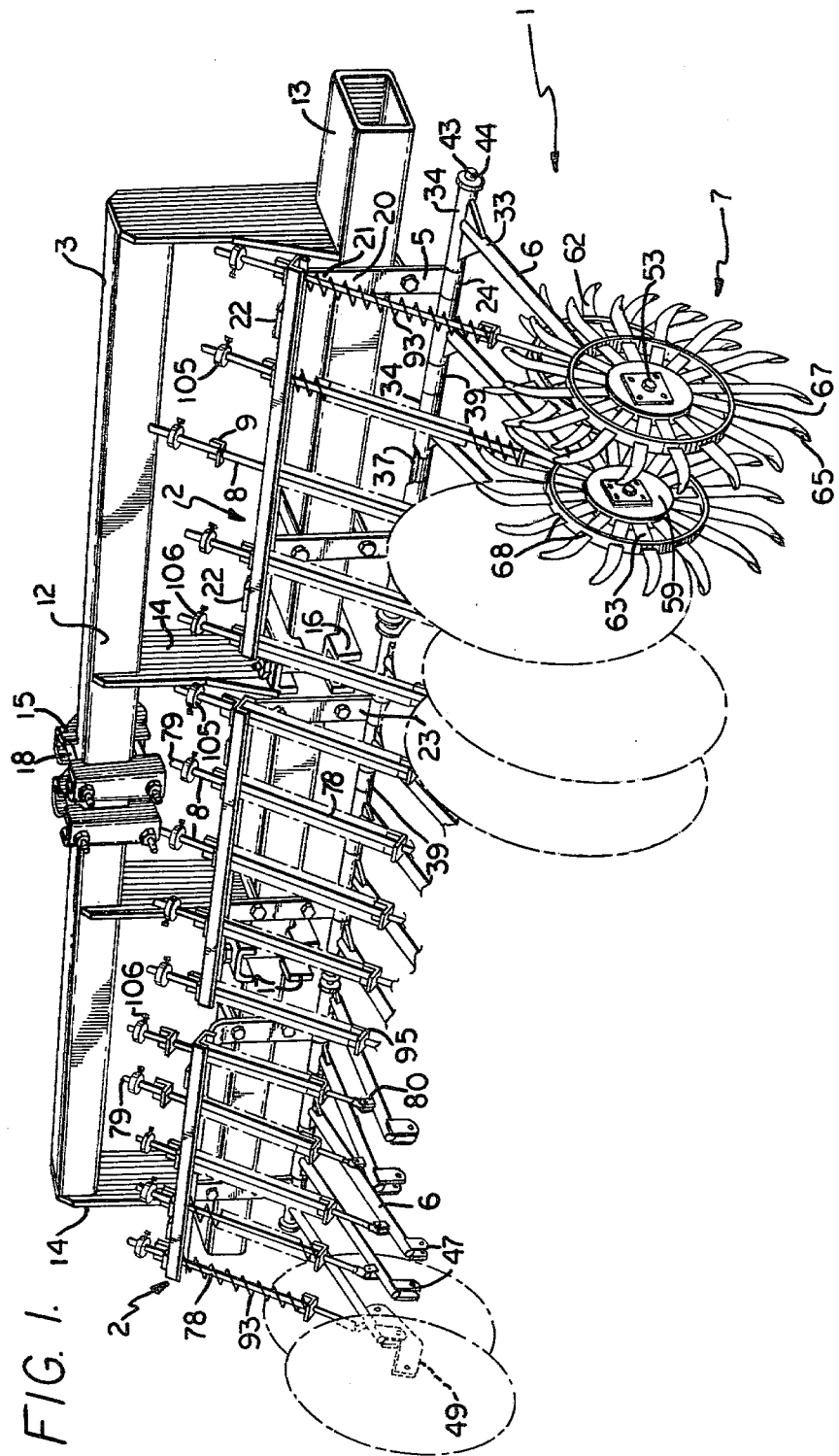
FIG. 1 is a rear perspective view of a rotary hoe implement unit embodying the present invention and which is mounted to a tool bar.

Referring more in detail to the drawings:

The reference numeral 1 generally indicates a rotary hoe implement embodying the present invention and mounted in side-by-side or ganging relation with a plurality of like rotary hoe implements 1 to comprise a rotary hoe unit 2, FIG. 1. A plurality of rotary hoe units 2 are selectively mounted along the length of a tool bar means 3 for connection to and drafting by a prime mover such as a tractor 4, shown diagramatically in FIG. 9. Each of the rotary hoe implements 1 includes a generally upstanding spacer member 5, or support bracket, with a tool support arm 6, or control bracket, pivotally mounted to a bottom end thereof for upward and downward swinging movement. A rotary hoe structure 7 is rotatably mounted to a distal end of the tool support arm 6 for tilling the soil.

A downward biasing means 8 extends between an upper end of the spacer member 5 and the distal end of the tool support arm 6 and resiliently urges the rotary hoe structure 7 into earth engagement. The downward pressure exerted on the rotary hoe structure 7 is readily set by manipulation of an adjustment means 9 to adapt the rotary hoe implement 1 for use in varying soil conditions, terrain types, and crops.

In the illustrated example, the rotary hoe units 2 are selectively mounted in an array transverse to the line of draft along the length of the tool bar means 3. The exemplary tool bar means 3 includes upper and lower tool bars 12 and 13, such as of box beams, and interconnected by a plurality of spaced, generally upright, connector beams 14. The tool bar means 3 is suitably adapted for mounting to and drafting behind the tractor 4 and, in the illustrated example, includes a three-point hitch arrangement having an upper hitch connector 15 and spaced, lower hitch connectors 16 and 17. The connectors 15, 16 and 17 are suitably mounted to the respective upper and lower tool bars 12 and 13 such as by bolts 18.

A plurality of rotary hoe units 2, each comprising a plurality of rotary hoe implements 1, are shown selectively mounted to the tool bar means 3 in FIG. 1 wherein each of the rotary hoe units 2 is positioned along the length of the tool bar means 3 as desired for proper working of the soil and for proper crop management. In the illustrated example, each rotary hoe unit 2 is connected to the lower tool bar 13, although the rotary hoe unit 2 can be mounted to various tool bars of different configurations and sizes. Thus, the instant rotary hoe unit 2 is substantially universally mountable to tool bars in the possession of the owner, farmer or operator and without requiring a specially adapted tool bar dedicated for use with the rotary hoe unit 2. Accordingly, a rotary hoe unit 2 can be mounted to a tool bar and used in conjunction with other types of farming equipment also mounted on the same tool bar, if so desired by the farmer or operator.

Each rotary hoe unit 2 includes a plurality of spacer members 5 comprising at least first and second spacer members 20 and 21 respectively having first or upper ends 22 and second or lower ends 23. The lower end 23 of each spacer member 5 has a hanger or sleeve 24, or pivotal support means, affixed thereto having a through bore 25 for a purpose later described. The upper end 22 of each spacer member 5 is angled upwardly and rearwardly and has means defining an aperture associated therewith for receipt of an upper end of the downward biasing means 8. In the illustrated example, an elongate beam member 27, such as a channel beam having down-turned flanges 28 and a connecting web 29, extends generally horizontally between the lower surfaces of the respective upper ends of the first and second spacer members 20 and 21 and is secured thereto as by welding or the like. A plurality of apertures 30 extend through the web 29 of the beam member 27 in aligned relationship with the downward biasing means 18 of each rotary hoe implement 1. The apertures 30 are of a bore width and depth, described below, so as to not interfere with the free reciprocation of a portion of the downward biasing means therethrough.

The tool support arm 6 of each rotary hoe implement 1 is swingably connected to the hanger or sleeve 24. In the illustrated example, the tool support arm 6 is connected to the lower end 23 of each spacer member 5 and includes a forward end portion 33 having a sleeve member 34 normally affixed thereto, as by welding, and reinforced by gussets 35. The sleeve member 34 has a through bore 36 for receipt of an elongate, generally horizontally extending pivot shaft 37, or axle, for upward and downward swinging of each tool support arm 6 relative to each spacer member 5 and the tool bar means 3. To provide spacing between adjacent or ganged rotary hoe implements 1, a plurality of tubular spacers 39 are sleeved on the pivot shaft 37 and alternately positioned between the sleeve members 34 of respective tool support arms 6.

In the illustrated example, FIG. 1, five individual rotary hoe implements 1 comprise each rotary hoe unit 2 with the pivot shaft 37 providing a bottom connection to join the rotary hoe implements 1 in a gang. To maintain the sleeve members 34 and spacers 39 on the pivot shaft 37, opposite ends 41 and 42 of the pivot shaft 37, FIG. 3, have retainers affixed thereto including a washer 43 and cotter pin 44.

Each tool support arm 6 has a rearward or distal end 46 with spaced ears affixed thereto in downwardly extending relationship and forming a clevis 47. A substantially V-shaped walker arm 49 has a central portion 50 and opposite ends 51 and 52, with the central portion 50 and ends 51 and 52 each having an aperture extending therethrough. The walker arm 49 is pivotally mounted to the distal end clevis 47 by a pin or bolt 53 extended through the aperture in the central portion 50 and secured by a nut 54.

A rotary hoe structure 7 is mounted to the tool support arm 6 and, in the illustrated example, comprises front and rear rotary hoes 56 and 57, each including a central hub structure 59 with an axial bore 60 therethrough and formed of spaced, circular plates 61. A plurality of elongate hoe teeth 62 extend radially outward from the central hub structure 59 and have radially inner end portions 63 captured between the circular plates 61 and affixed thereto as by welding or the like. The hoe teeth 62 are respectively formed of substantially elongate bars of metal such as steel with the width dimension of each bar positioned longitudinally with the direction of forward, rolling movement of the rotary hoe structure 7. Radially outer end portions 65 are flattened laterally and curved rearwardly to the direction of rolling movement to form spade-like tips 66 for penetrating the earth. The spade-like tips 66 curve forwardly in the direction of forward movement of the rotary hoe and tend to engage and throw small amounts of soil rearwardly as the rotary hoe structure 7 travels over the field to create a plurality of small pockets or depressions therein to catch and hold rainfall, rather than merely slicing through the soil. Intermediately of the radially inner end portion 63 and outer end portion 65, the hoe teeth 62 extend through an outer, ring shaped rim or felly 67 comprising a metal hoop, such as of bar stock, having the width dimension thereof arranged transversely to the line of rolling movement. A plurality of slots 68 extend through the outer rim or felly 67 at intervals and receive mid portions of the hoe teeth 62 therethrough.

Figure 3:
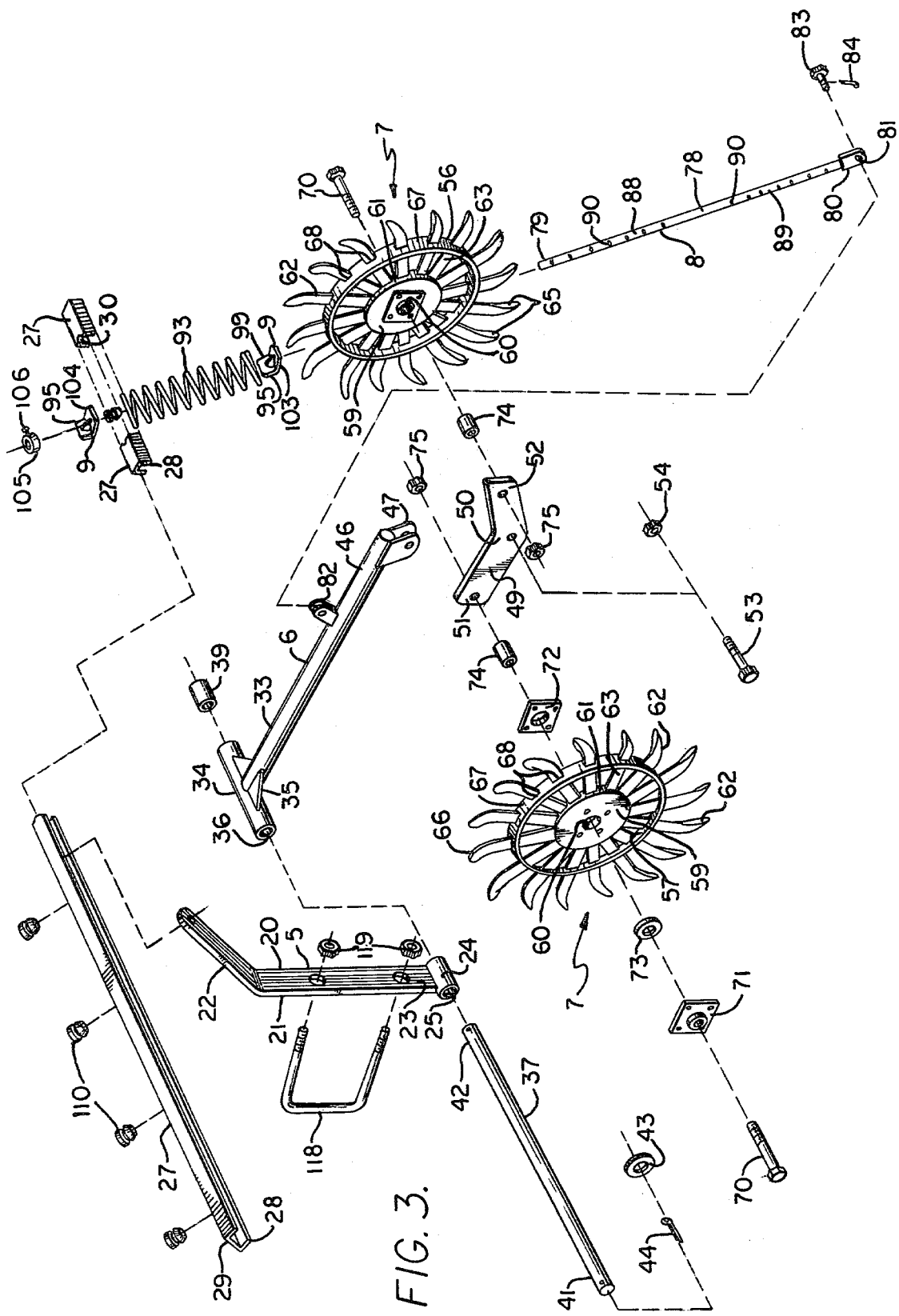
FIG. 3 is a disassembled, perspective view of a single rotary hoe implement which forms a portion of the implement unit.

The front and rear rotary hoes 56 and 57 are rotatably mounted adjacent opposite sides of the walker arm 49 for interference free rolling movement. In the illustrated example, each pivotal connection includes a pin or bolt 70 which extends through spaced bearing retainer plates 71 and 72 mounted on opposite sides of the central hub structure 59 and capturing a bushing 73 therebetween. A tubular spacer 74 is sleeved on the pin or bolt 70 to maintain the rotary hoe structure 7 in spaced relationship from the walker arm 49. The pin or bolt 70 is secured at the other side of the walker arm 49 at a selected end 51 or 52 by a nut 75. The mounting of the front and rear rotary hoes 56 and 57 at respectively opposite ends 51 and 52 of the walker arm 49 permits the rotary hoes 56 and 57 to act as counter balances for each other whereby downward force on the distal end 46 of the tool support arm 6 by the biasing means 8 is substantially evenly divided between the front and rear rotary hoes 56 and 57. As shown in FIG. 3, the pivotal connection of the walker arm 49 at the central portion 50 is closer to the arm rear end 52 than to the arm front end 51 whereby a greater amount of the downward force applied by the biasing means 8 is applied to the rear rotary hoe 57 than to the front rotary hoe 56. With the axis of rotation of the front and rear rotary hoes 56 and 57 positioned above the axis of rotation of the walker arm 49, a portion of the downward force applied by the downward biasing means 8 to the rear rotary hoe 57 is transferred during forward movement to the front rotary hoe 56 whereby the downward force is substantially equally divided therebetween.

The downward biasing means 8 generally extends between the upper end 22 of the spacer member 5 and the tool support arm 6 and, in the illustrated example, includes an elongate rod member 78 having upper and lower ends 79 and 80. The lower end 80 is flattened and has an aperture 81 extending therethrough for pivotal connection to a clevis 82 mounted on an upper surface portion of the tool support arm 6 adjacent the distal end 46. A pivot pin 83 secured by a cotter pin 84 connects the lower end 80 to the clevis 82.

Positioned at intervals along a rod member upper portion 88 and a rod member lower portion 89 are a plurality of pairs of notches 90 each extending into the rod member 78 from opposite sides and having flattened bottom portions 91.

The rod member 78 extends generally forwardly from the distal end 46 of the tool support arm 6 whereby the rod member upper end 79 is positioned generally in vertically spaced relationship from the forward end portion 33 of the tool support arm 6. In the illustrated example, the rod member 78 is generally upstanding or inclined upwardly from the pivotal connection of the rod member lower end 80 with the tool support arm distal end 46. The rod member upper end 79 extends through a selected aperture 30 in the elongate beam member 27. The downward biasing means 8 is associated with the rod member 78 and, in the illustrated example, includes an elongate coil spring 93 sleeved on the rod member 78 and extending generally between the juncture of the rod upper portion 88 with the beam member 27 and downwardly to a selected position on the rod lower portion 89.

The adjustment means 9 permits controlling the resiliency of the coil spring 93 by regulating the amount of compression thereof, or effective spring length, and includes the paired notches 90 and upper and lower retainers such as clips 95, FIGS. 4 and 11. Each clip 95 is generally L-shaped and includes a first arm portion or tang 96 adapted for manipulation and a second arm portion or retainer plate 97 adapted for engagement with the rod member 78. An aperture 99 extends through the clip 95 generally at the juncture of the tang 96 and the retainer 97 and includes a semi-circular portion 100, FIG. 4, in the tang 96 and a semi-circular portion 101 in the retainer plate 97. A slot 102 extends into the retainer plate 97 from the semi-circular portion 101. The portion of the aperture 99 formed by the semi-circular portions 101 and 102 is of a size to permit the clip 95 to be freely moved back and forth on the rod member 78 whereas the slot 102 has a transverse dimension sized to snugly receive and clip about the rod member 78 at the notches 90. The retainer plate 97 at the slot 102 is of a thickness to be received within the notches 90, FIG. 4. The clip 95 is preferably formed of a material, such as metal, which is sufficiently resilient or spring-like to clip snugly about the notches 90 without a substantial tendency to work free from the jouncing and jolting of the rotary hoe implement 1 during travel over the earth surface.

In the illustrated example, there are two such clips 95 comprising a lower clip 103 and an upper clip 104. The lower clip 103 is engaged in a selected pair of notches 90 at a rod lower portion 89 and the upper clip 104 is engaged in a selected pair of notches 90 at a rod upper portion 88. The coil spring 93 has a lower end seated against the retainer plate 97 of the lower clip 103 and an upper end seated against the portion of the beam member 27 surrounding the selected aperture 30. The upper clip 104 is resiliently engaged with the rod member and positioned on the portion of the rod member 78 between the upper end 79 thereof and the rod juncture with the beam member 27. The upper clip 104 effectively prevents the rod member upper end 79 from slipping out of reciprocal engagement with the aperture 30. As a safety or backup device for the upper clip 104, a collar 105 is affixed, as by a set screw 106, to the rod upper end 79.

Preferably, the aperture 30 has an internal bore or bearing surface of a length greater than the longitudinal width or size of the opening of the notches 90 so that the nothes 90 do not catch or interfere with sliding movement of the rod member 78 through the aperture 30. In the illustrated example, the aperture 30 includes a bushing 110, FIGS. 4 and 7, received within the aperture 30 and having a circular upper flange 111 spaced from a lower frusto-conical end 112 by an annular recess 113. A smooth sided bore 114 of the length set forth above extends axially through the bushing 110 for sliding, bearing contact with the rod member 78. Preferably, the bushing 110 is of a resilient, sound deadening material such as synthetic rubber or the like for insertion into the aperture 30. A diagonal slit 115 extends the length of the bushing 110 and facilitates spindling and resilient insertion of the bushing into the aperture 30. The material of the web 29 defining the aperture 30 is received within the annular recess 113 to secure the bushing 110 to the beam member 27. The upper portion 88 of the rod member 78 reciprocably extends through the bushing 110 and moves longitudinally therethrough as the front and rear rotary hoes 56 and 57 travel over uneven ground terrain and as the tool support arm 6 swings upwardly and downwardly. Non-binding movement of the rod member 78 is provided by the length of the bushing bore 114 relative to the longitudinal width of the pairs of notches 90. Moreover, the resilient rubber material of the bushing 110 provides sound deadening to inhibit rattling, squeaking and the like.

Figure 2:
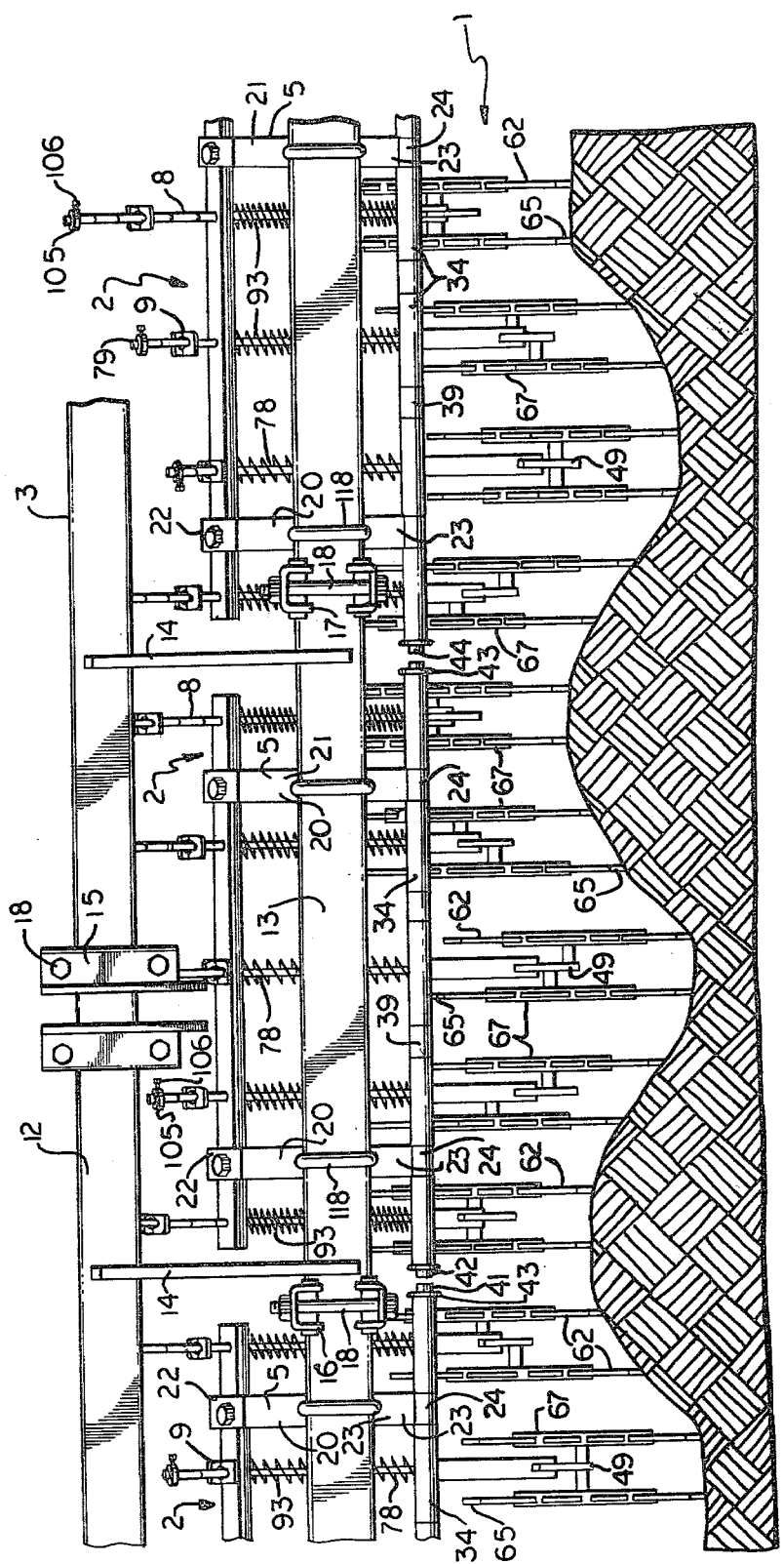
FIG. 2 is a fragmentary, rear elevational view of the rotary hoe implement unit and showing same in vertical movement over rolling terrain.

The rotary hoe implements 1 are connected or ganged together by a beam member 27 and a pivot shaft 37 of approximately equal length, FIG. 2, whereby the rotary hoe implements 1 are combined to form a rotary hoe unit 2. In the illustrated example, FIGS. 1 and 2, each rotary hoe unit 2 has five ganged together rotary hoe implements 1. Preferably, each rotary hoe unit 2 is of a length less than the length of the tool bar means 3 whereby a plurality of rotary hoe units 2 can be connected to a single tool bar means 3 with the spacing between units established as desired.

To mount each rotary hoe unit 2 to the tool bar means 3, an attachment means such as a U-bolt 118 is provided which extends around the lower tool bar 13 and has free ends connected to mid-portions of each of the spacer members 5, as by bolts 119. Through the use of various attachment means, such as the U-bolts 118, connection to variously sized and configured tool bars 3 can be accomplished.

The path of a rotary hoe implement 1 is shown diagramatically in FIG. 8 whereby an arrow 125 indicates the path of movement of the rotary hoe implement over rough terrain, indicated at 126. The upwardly and downwardly swingable tool support arm permits the rotary hoe structure 7 to ride upwardly and downwardly over humps or ridges 127, across flats 128, and through troughs or depressions 129. To allow relatively free upward and downward movement of the tool support arm 6, the lower and upper clips 103 and 104 are adjusted on the rod member 78 so that the coil spring 93 is not compressed between the lower clip 103 and the beam member 27 when the rotary hoe implement 1 is at rest. This selectively loose position permits relatively free floating of the rotary hoe implement 1 over the humps 127, flats 128 and troughs 129. Further, the lower and upper clips 103 and 104 can be adjusted on the rod member 78 to compress the coil spring 93 as desired between the lower clip 103 and the beam member 27 whereby upward and downward swinging movement of the tool support arm 6 is relatively stiff and the rotary hoe structure 7 is downwardly biased with sufficient force to punch the hoe teeth 62 through small hillocks or humps in the soil. Such a path is shown along the line 131, FIG. 8 with the direction of movement of the rotary hoe implement 1 indicated by the arrow 132. While traversing flat terrain 128, the hoe teeth 62 bite or dig into the soil with the teeth extending thereto at one depth. When a hump or ridge 127 is encountered, the hoe teeth 62 extend thereinto at even a greater depth to tend to smooth out humps or ridges in the field.

Adjustment of the downward force of the biasing means 8 is accomplished in the field by selectively varying the height that the rod member 78 extends above the beam member 27. Generally, the greater the amount of the rod member 78 extending above the beam member 27, the less downward pressure is applied to the rotary hoe structure 7. Conversely, the lesser the amount of the rod member 78 extending above the beam member 27, the greater the downward pressure applied to the rotary hoe structure 7. To control the amount of extension above the beam member, the lower clip 103 is moved upwardly or downwardly as desired. The upper clip 104 also moves with the lower clip 103 to limit the extent of downward retraction of the rod member 78 from the beam member 27.

It is to be understood that while one form of this invention has been illustrated and described, it is not to be limited to the specific form or arrangement of parts herein described and shown, except insofar as such limitations are included in the following claims.

What is claimed and desired to secure by Letters Patent is:

1. An agricultural rotary hoe implement unit comprising:
(a) at least two upstanding spacer members having first and second ends, said spacer members being separated transversely from each other relative to a line of draft;
(b) attachment means for connection of said spacer members to a tool bar for drafting by a prime mover;
(c) an elongate beam connected to first ends of said spacer members and extending transversely to a line of draft, said beam having a plurality of means defining spaced apertures through said beam and extending along the length thereof;
(d) an elongate pivot rod connected to said second ends of said spacer members and extending transversely to a line of draft;
(e) a plurality of tool support arms having forward ends swingably connected to said pivot rod for upward and downward swinging movement and having rearwardly disposed distal ends;
(f) a plurality of adjustment rods having rearward end portions swingably attached to the distal ends of said tool support arms and forward end portions reciprocably extending through respective said apertures and spaced in a generally vertical plane from the respective forward ends of said tool support arms whereby said adjustment rods extend in diverging forward relationship to respective said tool support arms;
(g) spring members respectively sleeved on said adjustment rods and extending at least part way between said forward and rearward end portions thereof and having one end portion for biasing engagement with said elongate beam to urge the rearward end portions of said adjustment rods toward an earth surface;
(h) adjustment stop means engaged with said adjustment rods and contacting said spring members to control biasing pressure of said spring members relative to said elongate beam;
(i) a plurality of rotary hoes and pivotal means connecting said rotary hoes to said distal ends of said hoe support arms for travel in respective upright planes over an earth surface;
(j) said elongate beam and said pivot rod being of a substantially equal length less than the length of said tool bar to comprise a fraction thereof whereby two or more rotary hoe implement units are attachable to said tool bar in selectively spaced relationship.

2. In a system comprising a tractor in combination with an earth treatment apparatus attached thereto, said tractor and apparatus supported on and forwardly movable along an earth surface, said earth surface having a non-uniform contour in a direction transverse to the direction of forward movement of said tractor and apparatus, the improvement comprising that;
said apparatus comprises a first horizontally extending lower rigid beam and a second horizontally extending rigid upper beam, said first beam and said second beam vertically spaced from each other, firmly joined to each other, and extending transverse to said direction of forward movement, hitch means on said first and second beams, said hitch means attaching together said apparatus and tractor,
a rigid horizontally extending control bracket, and vertically extending support brackets firmly connected to said control bracket, each of said vertically extending support brackets also firmly attached to one of said beams, a pivotal support means attached at the bottom of each vertically extending support brackets and a plurality of rigid pivot arms each pivotally supported at its front end on said pivotal support means and extending rearwardly thereof to a rear end of said pivot arm,
a straight rigid vertically extending adjustment rod pivotally attached to the rear end of each of said pivot arms and extending vertically above said pivot arm, a series of pairs of notches, each notch extending vertically and transversely of said adjustment rod and each of said series of pairs of notches spaced apart from others of said series along the length of said adjustment rod from the lower end thereof and from the upper end thereof, the upper end of said adjustment rod extending through a cylindrical hole therefor in a bushing held in said control bracket, said control bracket located above and rearwardly of said one of said beams, said hole having a smooth vertically extending interior surface extending vertically from top to bottom of said bushing for a greater distance than the vertical extent of said notches in said adjustment rod, a long vertically extending helical spring means extending along the length of said adjustment rod and wound around it, a lower spring support means releasably attached to said adjustment rod and fitting in one of said series of pairs of notches and located at the lower end of said spring means, said spring means seating at its upper end against said control bracket, an upper spring support releasably engaging one of said pairs of notches in said adjustment rod above said control bracket, an earth treating tool at the rear end of each of said pivot arms, said tool being operably supported on the rear end of said pivot arm, and wherein said lower spring support means comprises a first horizontally extending plate with a slot extending therealong and a second vertically extending plate joined at its lower end to the slotted end of said first plate, a hole in said upper plate larger in diameter than the diameter of said adjustment rod arm, said slot in said first plate being smaller than the diameter of said control arm and fitting in one of said pairs of notches in said adjustment rod, and said spring support means is resiliently deformable.

3. Apparatus as in claim 2 wherein said tool is a rotary mounted hoe and is rotatably supported on said pivot arm.

4. Apparatus as in claim 3 wherein said hoe comprises a center plate, a plurality of teeth and a reinforcing ring, said plate located in the center of said hoe, said teeth extending radially from said plate, said ring located intermediate the ends of said teeth and said plate and said teeth having an outer end which extends forwardly in the direction of forward movement of said apparatus.

5. An earth treatment apparatus forwardly movable along an earth surface, which earth surface has a non-uniform contour in a direction transverse to the direction of forward movement of said apparatus said apparatus comprising a first horizontally extending lower rigid beam and a second horizontally extending rigid upper beam, said first beam and said second beam vertically spaced from each other, firmly joined to each other and extending transverse to said direction of forward movement, a rigid horizontally extending control bracket, and vertically extending support brackets firmly connected to said control bracket, each of said vertically extending support brackets also firmly attached to one of said beams, a pivotal support means attached at the bottom of each vertically extending support bracket and a plurality of rigid pivot arms each pivotally supported at its front end on said pivotal support means and extending rearwardly thereof to a rear end of said pivot arm, a straight rigid vertically extending adjustment rod pivotally attached to the rear end of each of said pivot arms and extending vertically above said pivot arm, a series of pairs of notches, each notch extending vertically and transversely of said adjustment rod and each of said series of pairs of notches spaced apart from others of said series along the length of said adjustment rod from the lower end thereof and from the upper end thereof, the upper end of said adjustment rod extending through a cylindrical hole therefor in a bushing held in said control bracket, said control bracket located above and rearwardly of said one of said beams, said hole having a smooth vertically extending interior surface extending vertically from top to bottom of said bushing for a greater distance than the vertical extent of said notches in said adjustment rod, a long vertically extending helical spring means extending along the length of said adjustment rod and wound around it, a lower spring support means releasably attached to said adjustment rod and fitting in one of said series of pairs of notches and located at the lower end of said spring means, said spring means seating at its upper end against said control bracket, an upper spring support releasably engaging one of said pairs of notches in said adjustment rod above said control bracket, an earth treating tool at the rear end of each of said pivot arms, said tool being operably supported on the rear end of said pivot arm, and wherein said lower spring support means comprises a first horizontally extending plate with a slot extending therealong and a second vertically extending plate joined at its lower end to the slotted end of said first plate, a hole in said upper plate larger in diameter than the diameter of said adjustment rod arm, said slot in said first plate being smaller than the diameter of said control arm and fitting in one of said pairs of notches in said adjustment rod, and said spring support means is resiliently deformable.

6. Apparatus as in claim 5 wherein said tool is a rotary mounted hoe and is rotatably supported on said pivot arm.

7. Apparatus as in claim 6 wherein said hoe comprises a center plate, a plurality of teeth and a reinforcing ring, said plate located in the center of said hoe, said teeth extending radially from said plate, said ring located intermediate the ends of said teeth and said plate and said teeth having an outer end which extends forwardly in the direction of forward movement of said apparatus.

8. An agricultural rotary hoe implement comprising:
(a) an upstanding spacer member having upper and lower ends with one of said ends having means defining an aperture associated therewith, said aperture having a generally upwardly oriented axis, and the other of said ends having bearing means therewith;
(b) attachment means for connection of said spacer member to a tool bar for drafting by a prime mover;
(c) a tool support arm having a forward end pivotally connected to said bearing means for upward and downward swinging movement and having a rearwardly extended distal end;
(d) an elongate adjustment rod having a rearward end portion swingably attached to said arm distal end and a forward end portion reciprocably extending through said aperture and spaced substantially vertically from the forward end of said tool support arm whereby said adjustment rod extends in diverging forward relationship to said tool support arm;
(e) a spring member sleeved on said adjustment rod and extending at least partway between said forward and rearward end portions thereof;
(f) a plurality of paired notches spaced longitudinally along said adjustment rod;
(g) adjustment stop clips respectively having resilient portions engaging said paired notches and limiting extension of said spring member, thereby controlling movement of said tool support arm distal end toward and away from an earth surface; and (h) a rotary hoe and pivotal means connecting same to said distal end for travel in an upright plane over an earth surface and whereby said adjustment rod and stop clips provide ease of adjustment to control ground engagement of said rotary hoe;
(i) said rotary hoe implement including a bushing in said aperture and having an internal bearing surface for ease of reciprocal movement of said adjustment rod;
(j) said internal bearing surface being of a length greater than the longitudinal width of said notches on said adjustment rod whereby said notches do not interfere with sliding of said rod through said bushing.

9. An agricultural rotary hoe implement comprising:
(a) an upstanding spacer member having upper and lower ends with one of said ends having means defining an aperture associated therewith, said aperture having a generally upwardly oriented axis, and the other of said ends having bearing means therewith;
(b) attachment means for connection of said spacer member to a tool bar for drafting by a prime mover;
(c) a tool support arm having a forward end pivotally connected to said bearing means for upward and downward swinging movement and having a rearwardly extended distal end;
(d) an elongate adjustment rod having a rearward end portion swingably attached to said arm distal end and a forward end portion reciprocably extending through said aperture and spaced substantially vertically from the forward end of said tool support arm whereby said adjustment rod extends in diverging forward relationship to said tool support arm;
(e) a spring member sleeved on said adjustment rod and extending at least partway between said forward and rearward end portions thereof;
(f) a plurality of paired notches spaced longitudinally along said adjustment rod;
(g) adjustment stop clips respectively having resilient portions engaging said paired notches and limiting extension of said spring member, thereby controlling movement of said tool support arm distal end toward and away from an earth surface;
(h) a rotary hoe and pivotal means connecting same to said distal end for travel in an upright plane over an earth surface and whereby said adjustment rod and stop clips provide ease of adjustment to control ground engagement of said rotary hoe;
(i) said rotary hoe implement including a plurality of spacer members, attachment means, tool support arms, adjustment rods, spring members, paired notches, adjustment stop clips and rotary hoes arranged in abreast relation for connection as a unit to a tool bar;
(j) said spacer member upper ends having a beam member extending transversely to a line of draft and connecting adjacent spacer members and with a plurality of said means defining an aperture therealong; and
(k) an elongate pivot rod extending transversely to a line of draft and connecting adjacent spacer member bearing means and with a plurality of said tool support arms swingably connected thereto.

* * * * *